(12) United States Patent
Nakanishi

(10) Patent No.: US 8,118,471 B2
(45) Date of Patent: Feb. 21, 2012

(54) CONNECTING STRUCTURE, CABLE AND LIQUID CRYSTAL MODULE

(75) Inventor: Naoto Nakanishi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 615 days.

(21) Appl. No.: 12/060,912

(22) Filed: Apr. 2, 2008

(65) Prior Publication Data

US 2008/0239194 A1    Oct. 2, 2008

(30) Foreign Application Priority Data

Apr. 2, 2007  (JP) ................. 2007-096095

(51) Int. Cl.
*F21V 7/04*     (2006.01)
*G02F 1/1333*   (2006.01)
*G02F 1/1335*   (2006.01)

(52) U.S. Cl. ............ 362/630; 349/61; 349/58; 362/632; 439/841; 439/890

(58) Field of Classification Search ............... 439/890, 439/841; 349/58, 61; 362/630, 632
See application file for complete search history.

(56) References Cited

U.S. PATENT DOCUMENTS

| 3,456,339 A | 7/1969 | Small |
| 2005/0099554 A1* | 5/2005 | Hayano ............ 349/58 |
| 2006/0109689 A1* | 5/2006 | Tanaka ........... 362/632 |

FOREIGN PATENT DOCUMENTS

| DE | 199 49 036 A1 | 11/2000 |
| EP | 1 076 341 A1 | 2/2001 |
| EP | 1 238 849 A2 | 9/2002 |
| JP | 2002-124308 A | 4/2002 |
| JP | 2005-247049 A | 9/2005 |
| JP | 2005-347049 A | 12/2005 |
| WO | WO-00/51140 A1 | 8/2000 |

\* cited by examiner

*Primary Examiner* — Nathanael R Briggs
(74) *Attorney, Agent, or Firm* — Global IP Counselors

(57) ABSTRACT

A connecting structure for connecting a cable and a light source includes a wound part and a pin-shaped terminal. The wound part is formed at a distal end of the cable by bending an exposed end of a lead wire of the cable in a spiral shape. A direction of a center axis of the wound part substantially coincides with a direction of the distal end of the cable. The pin-shaped terminal is disposed at an end of the light source and fixedly connected to inside of the wound part. A direction of the pin-shaped terminal substantially coincides with the direction of the distal end of the cable.

7 Claims, 3 Drawing Sheets

CONNECTING STRUCTURE, CABLE AND LIQUID CRYSTAL MODULE

CROSS-REFERENCE TO RELATED APPLICATIONS

This application claims priority to Japanese Patent Application No. 2007-096095 filed on Apr. 2, 2007. The entire disclosure of Japanese Patent Application No. 2007-096095 is hereby incorporated herein by reference.

BACKGROUND OF THE INVENTION

1. Field of the Invention

The present invention generally relates to a connecting structure. More specifically, the present invention relates to a connecting structure for connecting a cable and a light source.

2. Background Information

A conventional liquid crystal module includes a lead cable and a cold cathode tube as a backlight. The cable includes a lead wire exposed at one end of the cable. An exposed end of the lead wire is bent to form a ring-shaped wound part. The cold cathode tube includes a pin-shaped terminal protruding from an end of the cold cathode tube. The pin-shaped terminal is inserted into the wound part of the cable and fixed to the wound part with solder.

Meanwhile, with another connecting structure for connecting a cold cathode tube, a flat doughnut-shaped terminal fitting is provided to a distal end of a power-feed wire. A pin-shaped terminal of the cold cathode tube is inserted into a hole of the terminal fitting. Then, the pin-shaped terminal and the terminal fitting are soldered together (see Japanese Laid-Open Patent Application Publication No. 2002-124308).

Also, with another connecting structure for connecting a cold cathode tube, a terminal protruding from an end of the cold cathode tube is bent in a hook shape. The hook-shaped terminal is hooked onto and soldered to a wheel-shaped part formed at a distal end portion of a power-feed wire (see Japanese Laid-Open Patent Application Publication No. 2005-247049)

With the conventional connecting structures, a direction of a center line of the ring-shaped wound part intersects a direction of the cable at a right angle. Thus, when the pin-shaped terminal of the cold cathode tube is inserted into the ring-shaped wound part and joined with the solder, the cable and the pin-shaped terminal of the cold cathode tube are not connected in a straight line. The connection is instead bent in an elbow shape. Consequently, stress concentrates at an elbow-shaped connection portion. Therefore, there is a risk of wire breakage.

Also, with the connecting structure of Japanese Laid-Open Patent Application Publication No. 2002-124308, a direction of a center line of the flat doughnut-shaped terminal fitting intersects a direction of the power-feed wire at a right angle. Thus, the same problems are encountered as with the above-mentioned conventional connecting structure. Furthermore, since the flat doughnut-shaped terminal fitting has to be separately produced and attached, both the number of required parts and the number of assembly steps increase.

With the connecting structure of Japanese Laid-Open Patent Application Publication No. 2005-247049, the hook-shaped terminal of the cold cathode tube is hooked onto and soldered to the wheel-shaped part of the power-feed wire. Thus, the cold cathode tube and the power-feed wire are connected in a straight line, which prevents stress from concentrating at a connected portion. However, in addition to bending the end of the power-feed wire into a ring shape, the terminal of the cold cathode tube has to be bent into a hook shape, or a cold cathode tube having a terminal bent in a hook shape has to be readied separately. Thus, the manufacturing cost increases.

In view of the above, it will be apparent to those skilled in the art from this disclosure that there exists a need for an improved connecting structure. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a connecting structure for a cable and a light source which prevents wire breakage without increasing manufacturing cost.

In accordance with one aspect of the present invention, a connecting structure for connecting a cable and a light source includes a wound part and a pin-shaped terminal. The wound part is formed at a distal end of the cable by bending an exposed end of a lead wire of the cable in a spiral shape. A direction of a center axis of the wound part substantially coincides with a direction of the distal end of the cable. The pin-shaped terminal is disposed at an end of the light source and fixedly connected to inside of the wound part. A direction of the pin-shaped terminal substantially coincides with the direction of the distal end of the cable.

With the connecting structure of the present invention, it is possible to provide a connecting structure which prevents wire breakage without increasing manufacturing cost.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
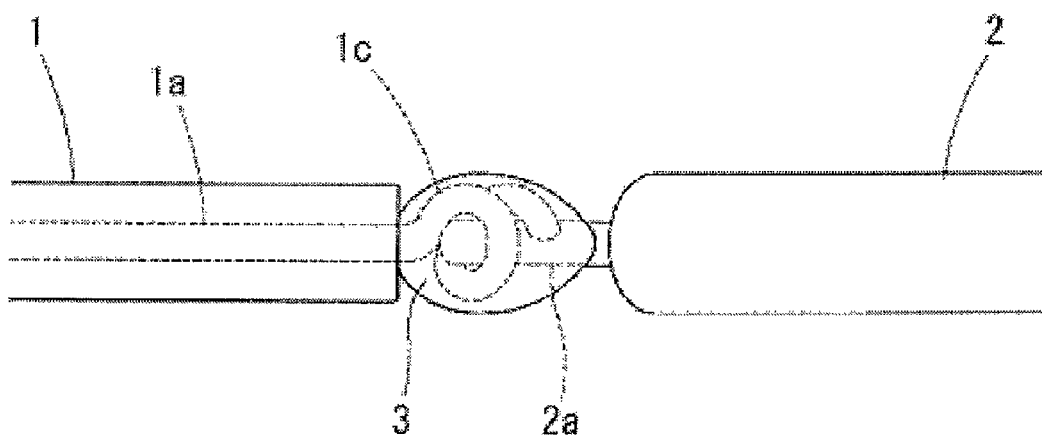
FIG. 1 is a front view of a connecting structure for connecting a cable and a light source in accordance with one embodiment of the present invention.
Figure 2:
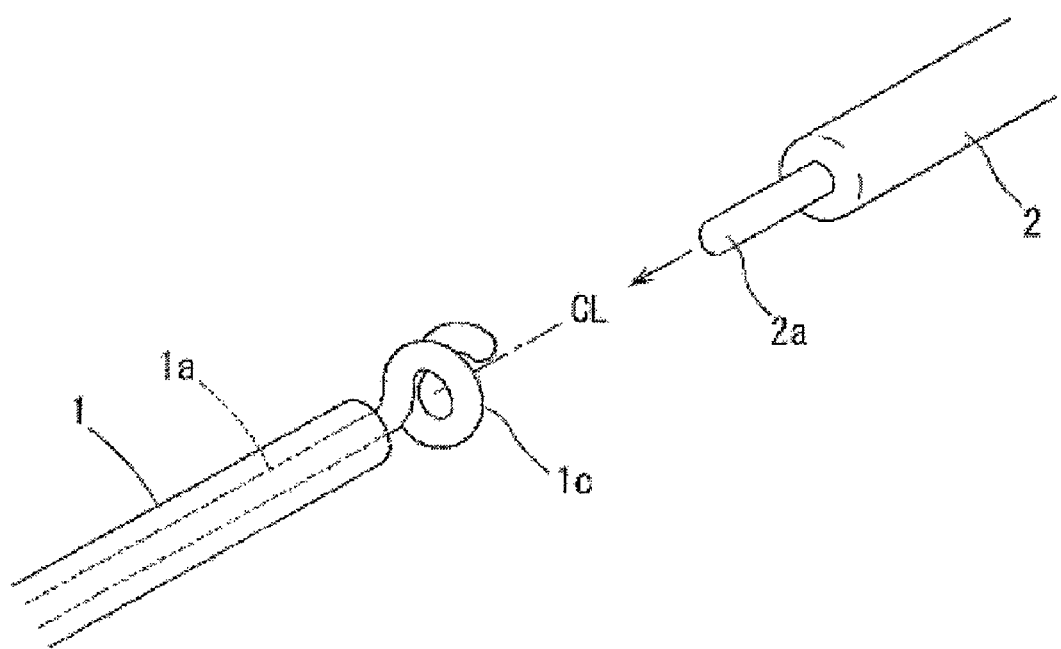
FIG. 2 is an exploded perspective view of the connecting structure illustrated in FIG. 1.

As shown in FIGS. 1 and 2, a connecting structure for connecting a cable (e.g., lead cable) 1 and a cold cathode tube (e.g., light source) 2 includes a spiral wound part 1c and a pin-shaped terminal 2a. The connecting structure electrically connects the cable 1 and the cold cathode tube 2 to supply power to the cold cathode tube 2 via the cable 1. The spiral wound part 1c is formed by bending an exposed end of a lead wire 1a of the cable 1. The pin-shaped terminal 2a protrudes from an end of the cold cathode tube 2. The pin-shaped terminal 2a of the cold cathode tube 2 is inserted into the spiral wound part 1c of the cable 1. Then, the pin-shaped terminal 2a is fixedly connected to inside of the spiral wound part 1c. Specifically, the pin-shaped terminal 2a and the spiral wound part 1c are joined with solder 3.

The lead wire 1a is made of twisted wires and is covered with an electrically insulating synthetic resin. The exposed end of the lead wire 1a is bent in a spiral shape to form the wound part 1c. The exposed end of the lead wire 1a is coated with solder to keep the twisted wires from fraying. As shown in FIG. 2, the spiral wound part 1c is formed so that a direction of a center line (center axis) CL of the spiral wound part 1c substantially coincides with a direction of the cable 1. More specifically, the direction of the center line CL substantially coincides with a direction along which a distal end part of the lead wire 1a extends. Therefore, when the pin-shaped terminal 2a of the cold cathode tube 2 is inserted into the wound part 1c, the cable 1 and the cold cathode tube 2 are positioned in a substantially linearly positional relationship. In other words, the cable 1 and the cold cathode tube 2 are positioned such that a direction of the pin-shaped terminal 2a substantially coincides with the direction of the cable 1 (the direction of the distal end of the cable 1). Therefore, when the pin-shaped terminal 2a and the wound part 1c are joined with the solder 3, the cable 1 and the pin-shaped terminal 2a of the cold cathode tube 2 are connected substantially in a straight line. As a result, stress generated in the connecting structure is reduced and relieved. Thus, the risk of wire breakage posed by the stress is prevented. Furthermore, the connecting structure can be implemented merely by bending the exposed end of the lead wire at the cable end into a spiral shape rather than a ring shape. Thus, it is necessary neither to separately produce and attach a terminal fitting in the form of a flat doughnut as with the conventional connecting structure, nor to bend the pin-shaped terminal of the light source into a hook shape as with the conventional connecting structure. Therefore, there is no worry about the cost being increased.

There are no particular restrictions on the number of winds of the spiral wound part 1c. However, the spiral wound part 1c preferably has one to one and a half winds. If there are more winds than one and a half winds, the bending of the exposed end of the lead wire 1a will be more difficult, and inserting the pin-shaped terminal 2a into the spiral wound part 1c becomes more complicated. On the other hand, when there is fewer than one wind, the pin-shaped terminal 2a can not be held in place securely and fall out before being soldered.

Figure 3:
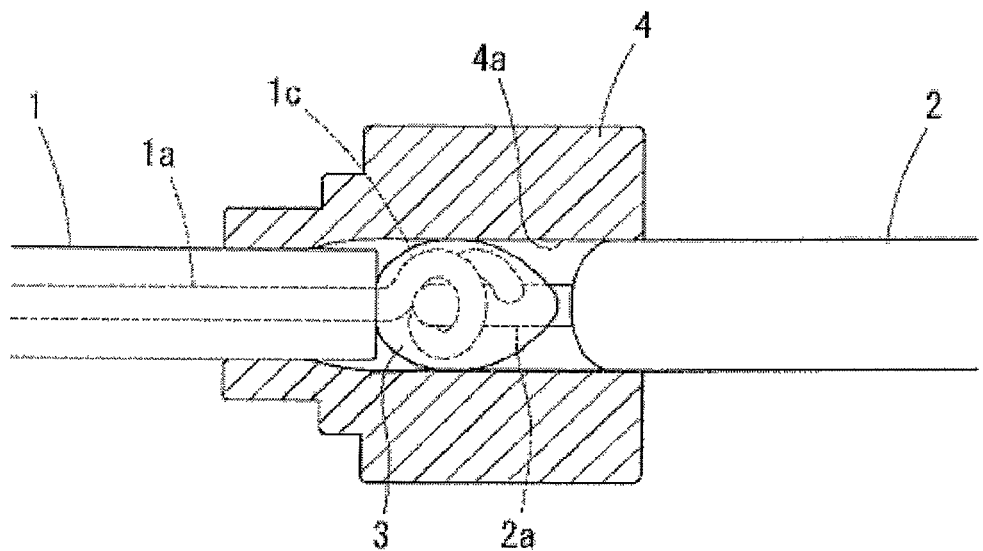
FIG. 3 is a cross sectional view of a rubber socket covering the connecting structure illustrated in FIG. 1.

As shown in FIG. 3, the connecting structure preferably includes a rubber socket 4 that covers a connected portion (e.g. soldered portion) where the pin-shaped terminal 2a is inserted into the wound part 1c and joined with the solder 3. With the rubber socket 4, the connected portion can be protected and effectively insulated.

The rubber socket 4 includes a through-hole 4a. When the rubber socket 4 is installed on the cable 1, the cable 1 is inserted to the through-hole 4a. Then, after the wound part 1c and the pin-shaped terminal 2a are joined with the solder 3, the rubber socket 4 is affixed by sliding the rubber socket 4 up to the connected portion. If the connected portion is bent in an elbow shape as with the conventional connecting structure, it is more difficult to affix the rubber socket 4 to the soldered joint. Moreover, a great deal of stress is concentrated at the connected portion of the conventional connecting structure. On the other hand, since the cable 1 and the pin-shaped terminal 2a of the cold cathode tube 2 are connected substantially in a straight line with the connecting structure, affixing the rubber socket 4 to the connected portion can be accomplished more simply than when an elbow-shaped connection is made as with conventional connecting structures. Moreover, the affixing of the rubber socket 4 will not cause stress to concentrate in the connected portion.

Figure 4:
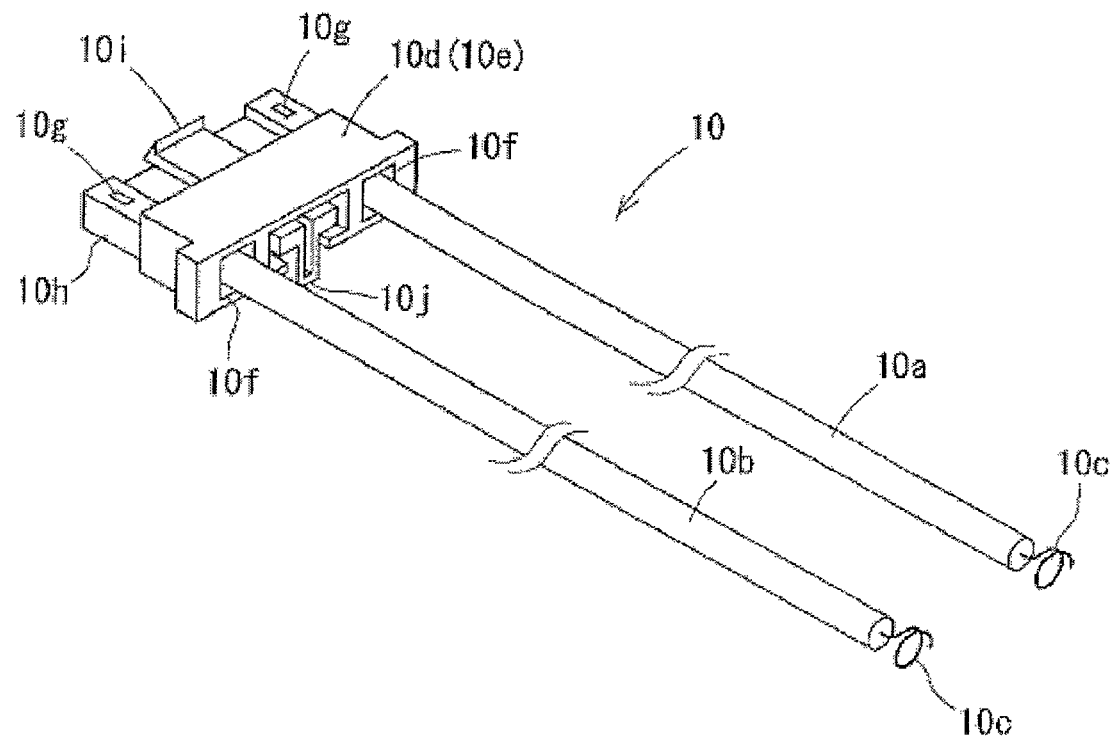
FIG. 4 is a perspective view of a cable used in the connecting structure illustrated in FIG. 1.
Figure 5:
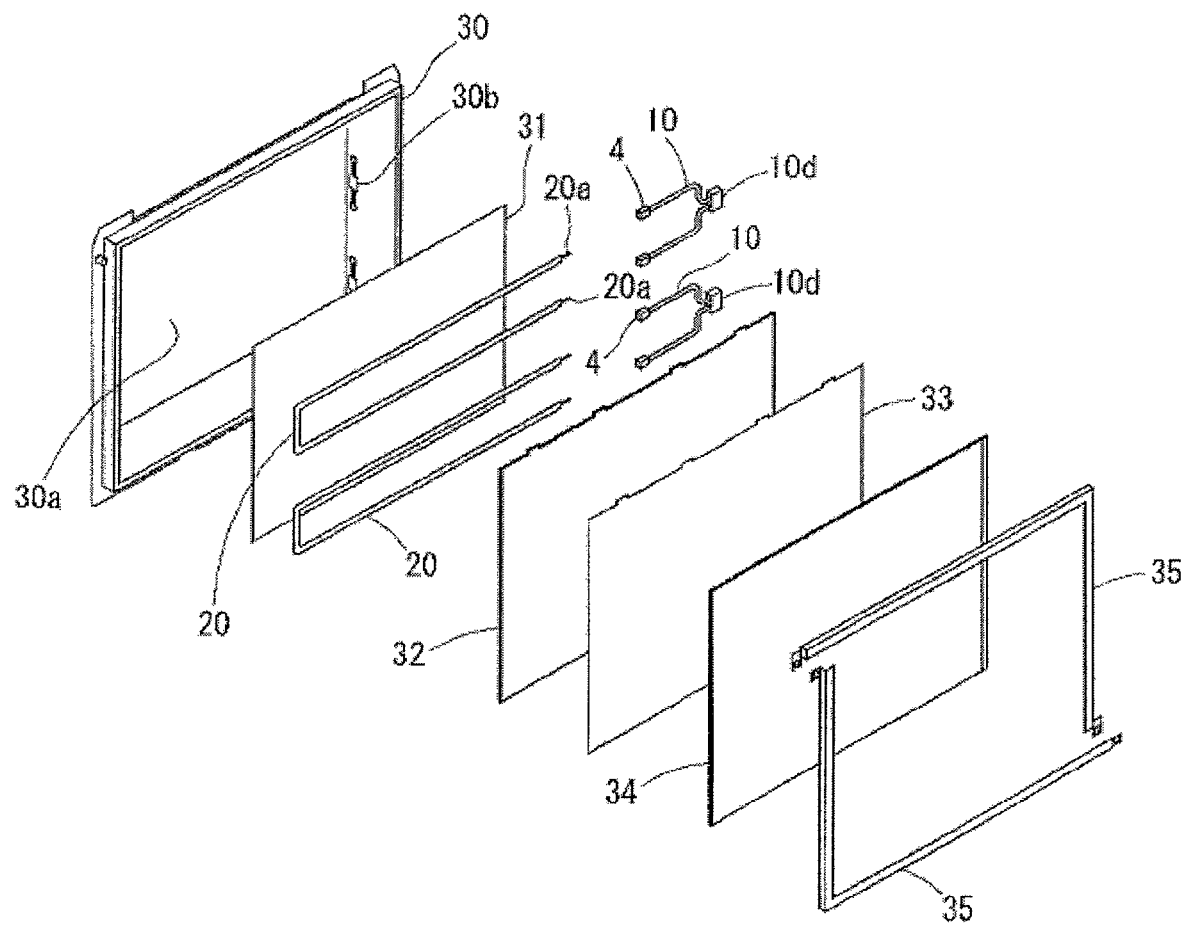
FIG. 5 is an exploded perspective view of a liquid crystal module including the connecting structure illustrated in FIG. 1.

Referring to FIGS. 4 and 5, a connector-equipped cable 10 and a liquid crystal module including the connecting structure shown in FIGS. 1-3 will be described.

As shown in FIGS. 4 and 5, the connector-equipped cable 10 includes two cables 10a and 10b and a connector 10d. In view of the similarity between the cable 1 and the cables 10a and 10b, the parts of the cables 10a and 10b that are identical to the parts of the cable 1 will be given the same name as the parts of the cable 1, and the descriptions of the parts of the cables 10a and 10b may be omitted for the sake of brevity. The cables 10a and 10b are connected to pin-shaped terminals 20a and 20b formed at both ends of a U-shaped cold cathode tube 20. Exposed ends of lead wires protruding from one ends of the cables 10a and 10b are bent to form spiral wound parts 10c. The connector 10d is provided to the other ends of the cables 10a and 10b.

The connector 10d is a male connector. The connector 10d includes a plastic housing 10e. The cables 10a and 10b are inserted into left and right openings 10f formed in the plastic housing 10e. Terminal parts 10g of the cables 10a and 10b are exposed on both sides on an upper face of a plug-in part 10h of the housing 10e. A latching tab 10i is formed on the plug-in part 10h. When an operating component 10j is pushed upward, the latching tab 10i rotates slightly downward. Therefore, when the plug-in part 10h of the connector 10d is plugged into a mating female connector, the latching tab 10i hooks onto the female connector so as not to come loose. On the other hand, when the operating component 10j is pressed to release hooking of the latching tab 10i, the connector 10d can be removed from the female connector. The connector 10d can also be a female connector instead.

As shown in FIG. 5, the liquid crystal module includes two of the connector-equipped cables 10, two of the cold cathode tubes 20, a shallow box-shaped frame 30, a light reflecting sheet 31, a light diffuser plate 32, a light diffuser sheet 33, a liquid crystal display panel 34 and bezels 35. The frame 30 includes a rear wall 30a and side walls (right, left, upper and lower side walls). The frame 30 opens at its front face. The right side wall includes openings 30b to take out the connector-equipped cables 10 to outside of the frame 30. In other words, the connector-equipped cables 10 extend through the openings 30b. Then, the connector-equipped cables 10 are electrically connected to the cold cathode tubes 20. The light reflecting sheet 31 is provided along the rear wall 30a. The cold cathode tubes 20 are disposed as a backlight on a front face side of the light reflecting sheet 31. The light diffuser plate 32, the light diffuser sheet 33 and the liquid crystal display panel 34 are stacked in this order on the front side of the cold cathode tubes 20. The bezels 35 are attached to an open part of the front face of the frame 30. The cold cathode tubes 20 and the connector-equipped cables 10 are connected with the connecting structure as explained through FIGS. 1-3. With the liquid crystal module, the connector-equipped cables 10 extends through the opening 30b formed on the right side wall. Thus, it is possible to place a circuit board so that the circuit board faces the rear wall 30a and connect the circuit board and the connector-equipped cables 10 that are taken out from the opening 30b. As a result, it is possible to flexibly place the circuit board in the liquid crystal module.

Specifically, the pin-shaped terminals 20a at both ends of each cold cathode tube 20 are inserted into and soldered to the spiral wound parts 10c exposed at one end of each of the two cables 10a and 10b of the connector-equipped cable 10. As a result, the cables 10a and 10b are connected substantially in a straight line with the pin-shaped terminals 20a of the cold cathode tube 20. Thus, stress does not concentrate in the connected portions. The connected portions are covered by the rubber sockets 4, as shown in FIG. 3. Therefore, the risk of wire breakage or current leakage is prevented. The connectors 10d are taken out to the outside through the openings 30b formed in the right side wall of the frame 30. Then, the connector 10d is plugged into female connectors of illumination wiring in a single operation.

The connecting structure and the cable 10 for connecting the pin-shaped terminal 20a can be used when connecting the cold cathode tube 20 installed into the liquid crystal module. However, the applications are not limited to this. For example, the connecting structure and the cable 10 can also be applied to a connection of a cable and a light source having a pin-shaped terminal other than a cold cathode tube.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position. Finally, terms of degree such as "substantially", "about" and "approximately" as used herein mean a reasonable amount of deviation of the modified term such that the end result is not significantly changed.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A liquid crystal module comprising:
   a liquid crystal panel;
   a light source configured to emit light to the liquid crystal panel, with the light source having a pin-shaped terminal disposed at an end of the light source, the light source including a cold cathode tube;
   a frame housing the liquid crystal panel and the light source within an inner space of the frame, the inner space of the frame being defined between first and second side walls of the frame, the first and second side walls of the frame facing each other in a longitudinal direction of the light source, one of the first and second side walls of the frame having an opening;
   a cable disposed through the opening of one of the first and second side walls of the frame, the cable being electrically connected to the light source, the cable having a lead wire and a wound part that is formed at a distal end of the cable by bending an exposed end of the lead wire of the cable in a spiral shape with the wound part being fixedly connected to the pin-shaped terminal that is inserted into and soldered to the wound part, the spiral shape having one to one and a half winds, a direction of a center axis of the wound part substantially extending parallel to a direction of the distal end of the cable, a direction of the pin-shaped terminal of the light source substantially extending parallel to the direction of the distal end of the cable; and
   a rubber socket with a straight through hole that extends through the rubber socket, the rubber socket housing a soldered portion of the pin-shaped terminal and the wound part within the straight through hole.

2. A liquid crystal module comprising:
   a liquid crystal panel;
   a light source configured to emit light to the liquid crystal panel, with the light source having a pin-shaped terminal disposed at an end of the light source;
   a frame housing the liquid crystal panel and the light source within an inner space of the frame, the inner space of the frame being defined between first and second side walls of the frame, the first and second side walls of the frame facing each other in a longitudinal direction of the light source, one of the first and second side walls of the frame having an opening with a continuous inner peripheral face; and
   a cable disposed through the opening of one of the first and second side walls of the frame, the cable being electrically connected to the light source, the cable having a lead wire and a wound part that is formed at a distal end of the cable by bending an exposed end of the lead wire of the cable in a spiral shape with the wound part being fixedly connected to the pin-shaped terminal that is inserted into the wound part, a direction of a center axis of the wound part substantially extending parallel to a direction of the distal end of the cable, a direction of the pin-shaped terminal of the light source substantially extending parallel to the direction of the distal end of the cable.

3. The liquid crystal module according to claim 2, wherein the pin-shaped terminal is inserted into and soldered to the wound part.

4. The liquid crystal module according to claim 3, wherein the wound part is formed in the spiral shape having one to one and a half winds.

5. The liquid crystal module according to claim 4, wherein the light source includes a cold cathode tube installed as a backlight to the liquid crystal module.

6. The liquid crystal module according to claim 2, wherein the light source includes a cold cathode tube installed as a backlight into the liquid crystal module.

7. The liquid crystal module according to claim 2, further comprising
   a connector provided to the other end of the cable.

* * * * *